United States Patent [19]

Toga

[11] Patent Number: 5,218,770
[45] Date of Patent: Jun. 15, 1993

[54] SURVEYING MACHINE FOR CONSTRUCTION WORK

[75] Inventor: Noriyuki Toga, Tokyo, Japan

[73] Assignee: Asahi Seimitsu Kabushiki Kaisha, Tokyo, Japan

[21] Appl. No.: 785,768

[22] Filed: Oct. 31, 1991

[30] Foreign Application Priority Data

Nov. 27, 1990 [JP] Japan ............................. 2-323849
Dec. 14, 1990 [JP] Japan ............................. 2-410536

[51] Int. Cl.$^5$ ........................................... G01B 11/26
[52] U.S. Cl. ........................................ 33/276; 33/227; 33/DIG. 21; 356/138
[58] Field of Search ................. 33/276, 277, 278, 279, 33/280, 227, DIG. 21, 286; 356/140, 144, 145, 146, 138

[56] References Cited

U.S. PATENT DOCUMENTS

| | | | |
|---|---|---|---|
| 3,667,849 | 6/1972 | Appler et al. | 33/DIG. 21 |
| 3,897,637 | 8/1975 | Genho | 33/290 |
| 4,333,242 | 6/1982 | Genho, Sr. | 33/227 |
| 4,441,818 | 4/1984 | Wickman | 356/138 |
| 4,852,265 | 8/1989 | Rando et al. | 33/227 |
| 4,902,130 | 2/1990 | Bouillot et al. | 356/138 |
| 4,912,851 | 4/1990 | Rando et al. | 33/227 |
| 4,971,440 | 11/1990 | Winckler et al. | 356/138 |
| 5,033,847 | 7/1991 | Hamblin et al. | 356/138 |
| 5,075,977 | 12/1991 | Rando | 33/227 |
| 5,108,177 | 4/1992 | Middleton | 356/138 |
| 5,144,486 | 9/1992 | Hart | 356/138 |

FOREIGN PATENT DOCUMENTS 0132320 5/1990 Japan ............................. 33/286

*Primary Examiner*—William A. Cuchlinski, Jr.
*Assistant Examiner*—William C. Dowling

[57] ABSTRACT

In the surveying for construction work carried out prior to actual construction to set up new stations serving as references of the construction work, measurements to set up various angles are contemplated, but it will be readily understood, from the viewpoint of many buildings or structure being based on the right angles, that most angle measerments are made to set up the right angles. A surveying machine for construction work is provided with a rotating projector adapted for rotational projection of at least a pair of laser beams in planes being perpendicular to each other so that new stations in a vertical plane, new station in another vertical plane being perpendicular to the first-mentioned vertical plane or new stations in a horizontal plane may be easily set up merely by observing the pair of laser beams intersecting perpendicularly to each other.

11 Claims, 10 Drawing Sheets

SURVEYING MACHINE FOR CONSTRUCTION WORK

BACKGROUND OF THE INVENTION

The present invention relates to a surveying machine for construction work used to set up new stations lying in a vertical plane, new stations lying in a vertical plane being perpendicular to the first-mentioned vertical plane or new stations lying in a horizontal plane.

In the surveying for construction work carried out prior to actual construction to set up new stations serving as references of the construction work, measurements to set up various angles are contemplated, but it will be readily understood, from the viewpoint of many buildings or structures being based on the right angles, that most of angle measurements are made to set up the right angles.

Figure 11:
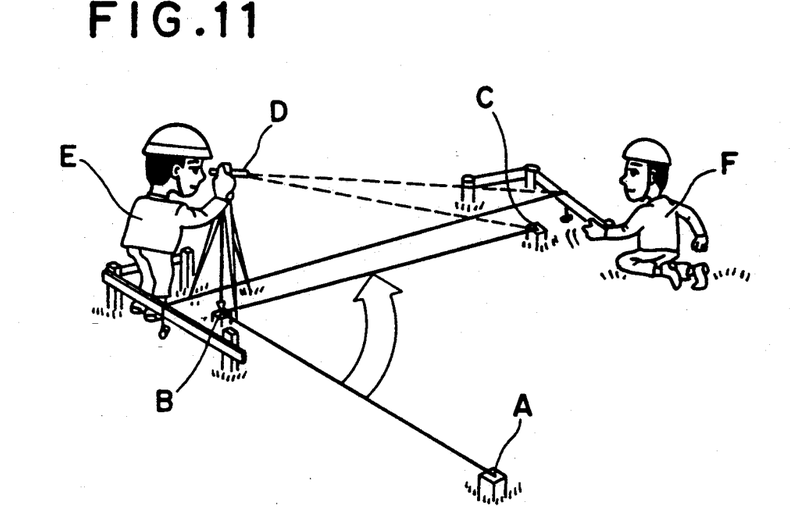
FIG. 11 illustrates a conventional manner of surveying.

The conventional measurement of right angle will be considered by way of example in reference with FIG. 11 of the attached drawings. To set up a new station C lying on a line which is perpendicular to the line connecting existing stations A and B, the measurement has been made according to a sequence as follows:

(1) A theodolite D is installed on the existing station B.

(2) The existing station A is sighted through the theodolite D.

(3) The theodolite D is turned by an angle of 90°.

(4) A surveying engineer E indicates by gesture a station to be sighted through the theodolite D.

(5) A laying off operator F marks the new station in response to the indication by the surveying engineer E.

As will be apparent from the sequence usually required for surveying, the surveying machine of prior art has inevitably encountered inconveniences as will be enumerated below during the surveying for construction work carried out according to the conventional surveying procedure.

(1) At least one surveying engineer E is essential to sight a target through the theodolite D and to turn the theodolite D.

(2) Such operation requires expert technique as well as high skillfullness.

(3) Marking for the new station is performed indirectly by the laying off operator F in response to the indication by surveying engineer E, resulting in a time-consuming and unreliable operation.

Accordingly, the present invention broadly resides in a surveying machine for construction work comprising rotating projector means adapted for rotational projection of at least a pair of laser beams in planes being perpendicular to each other.

As a specific measure, the invention provides a surveying machine for construction work comprising two or three radiant optical systems each adapted to radiate laser light emitted from a light source in the form of a laser beam, and rotating projector means adapted for rotational projection of said laser beams radiated from said two or three radiant optical systems in planes being perpendicular to one another, respectively.

A tilt of the laser beams rotationally projected by the rotating projector means may be arbitrarily adjusted, if required.

As a specific measure to solve the problems in a more direct manner, the invention provides a surveying machine for construction work comprising at least a pair of radiant optical systems each adapted to radiate laser light emitted from a light source in the form of a laser beam, and rotating projector means adapted for rotational projection of said laser beams radiated from said pair of radiant optical systems in vertical planes being perpendicular to each other, respectively.

The present invention further provides the surveying machine as has been mentioned immediately above, wherein there is provided a semi-transmissive reflector or prism adapted to divide the laser light emitted from the light source into two or three directions and there are provided two or three radiant optical systems adapted to radiate said two or three divided laser light rays in the form of laser beams, respectively.

In addition, the invention provides the surveying machine as has been mentioned just above, wherein there is additionally provided a radiant optical system to form an additional laser beam and there are provided rotating projector means adapted for rotational projection of three laser beams in the vertical planes being perpendicular to each other and in a horizontal plane, respectively.

Further, the present invention provides the surveying machine as has been mentioned just above, wherein there is provided within each radiant optical system a compensator adapted to maintain the rotationally projected laser beam in a horizontal or vertical plane regardless of a tilt of the machine body.

Surveying operation to set up right angles by use of the surveying machine for construction work of the invention will be described by way of example in reference with FIG. 10 of the attached drawings. The operation is made according to the following sequence.

(1) The surveying machine S for construction work of the invention is installed so that an intersecting point B' of the laser beams L1, L2 lying adjacent said machine S is vertically aligned with the existing station B.

(2) The one rotationally projected laser beam L1 is brought in coincidence with the existing station A.

(3) The laying off operator F directly marks a point irradiated with the other laser beam L2 which is perpendicular to said laser beam L1.

With a consequence, the following advantages are achieved over the surveying of prior art.

(1) The surveying engineer F is no longer necessary and therefore the labor saving is reliably achieved at least by one person.

(2) Both the expert technique and the skillfullness having conventionally been required to turn the theodolite D and to sight a target therethrough are no longer required.

(3) Marking of the new stations can be rapidly and precisely achieved by directly marking the points irradiated with the laser beam L2.

The surveying machine for construction work serving also as a leveling instrument can be provided by rotationally projecting one of two laser beams being perpendicular to each other in a horizontal plane.

The surveying machine for construction work serving as a leveling instrument can be provided also by incorporating an additional optical system in the above-mentioned surveying machine so as to form an additional laser beam which is to be rotationally projected in a horizontal plane.

When each radiant optical system contains therein a compensator, the rotationally projected laser beams can be maintained in vertical planes regardless of tilt of the machine body.

The surveying machine for construction work serving also as the leveling instrument can be provided also by modifying said surveying machine including the beam splitter such as the semi-transmissive reflector or prism adapted to divide the laser beam emitted from the light source, the radiant optical system or the like into two directions so that there is additionally provided a beam splitter to form an additional laser beam to be rotationally projected in a horizontal plane.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS:

The present invention will become more fully understood from the detailed description given hereinbelow and the accompanying drawings which are given by way of illustration only, and thus are not limitative of the present invention, and wherein.

EMBODIMENTS

In the course of the following detailed description of the embodiments of the present invention, reference will be made to the attached drawings.

Figure 2:
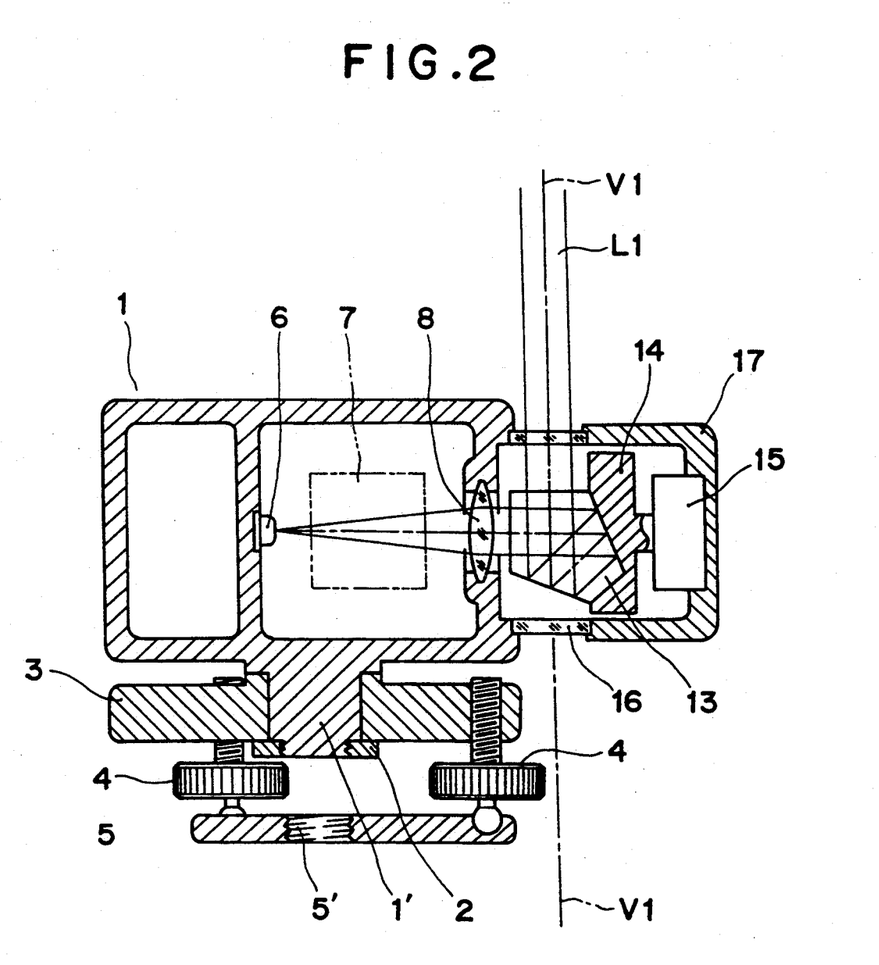
FIG. 2 is a schematic sectional view taken along a line Y—Y normal to the plane of FIG. 1.
Figure 10:
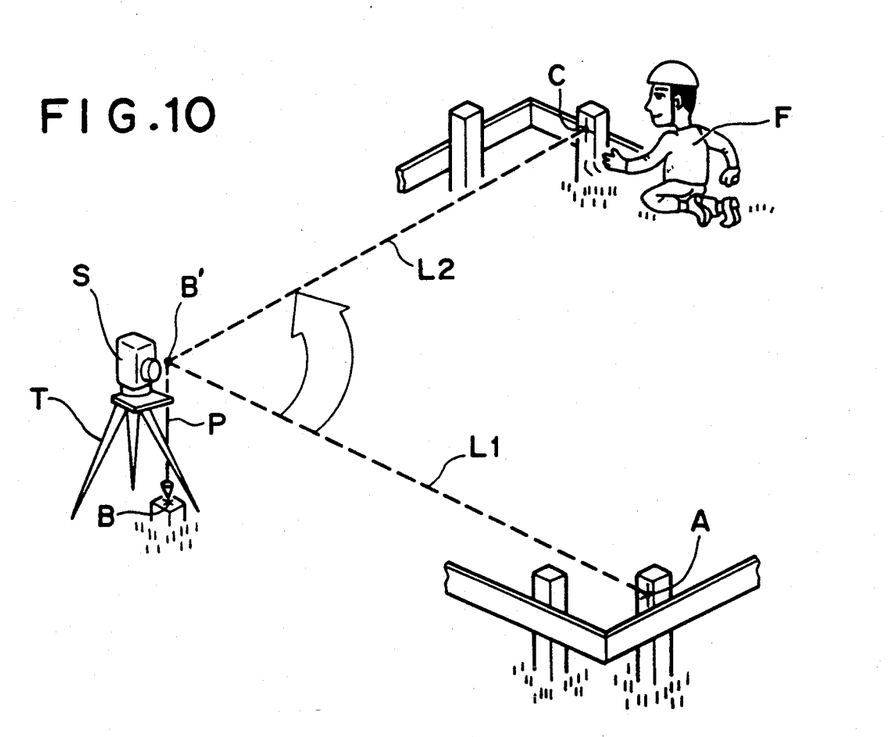
FIG. 10 illustrates a manner of surveying using the surveying machine for construction work of the invention.

Now referring to FIG. 2, reference numeral 5 designates a base plate serving as a joint member adapted to mount a machine S on a tripod T as illustrated in FIG. 10 and having a threaded hole 5' for mounting the machine S on the tripod T. Reference numeral 4 designates leveling screws provided at three different locations so that the respective screws may be vertically adjusted relative to the base plate 5 and thereby a machine body 1 may be installed in a horizontal posture, namely, leveled up. With the machine being not equipped with a compensator 7 as will be described later, these leveling screws 4 will be utilized to achieve a precise leveling up on the basis of a sensitive bubble tube (not shown) incorporated in the machine body 1, but, with the machine equipped with the compensator 7, said leveling screws 4 are used to carry out a rough leveling up, since said leveling screws 4 function to maintain laser beam emitted from a radiant optical system in vertical direction with respect to any tilt of the machine body 1.

A vertical shaft 1' arranged integrally with the machine body 1 is a rotatable shaft serving to direct laser beam L1 (or L2) toward an existing station and supported by a bearing bracket 3. It should be understood that, though not shown, a well known fine adjustment is preferably used with said vertical shaft 1'. Reference numeral 6 designates a light source. While it is preferred to employ a laser diode as the light source in order to make the machine body 1 compact, it is principally possible to employ a He Ne gas laser. Reference numeral 8 designates a radiant lens serving for substantially collimating the laser light emitted from the light source 6 and a specific construction of this lens (types, numbers and arrangement of component lenses) depends upon the particular light source 6 and the particular compensator 7 used in this machine.

Figure 1:
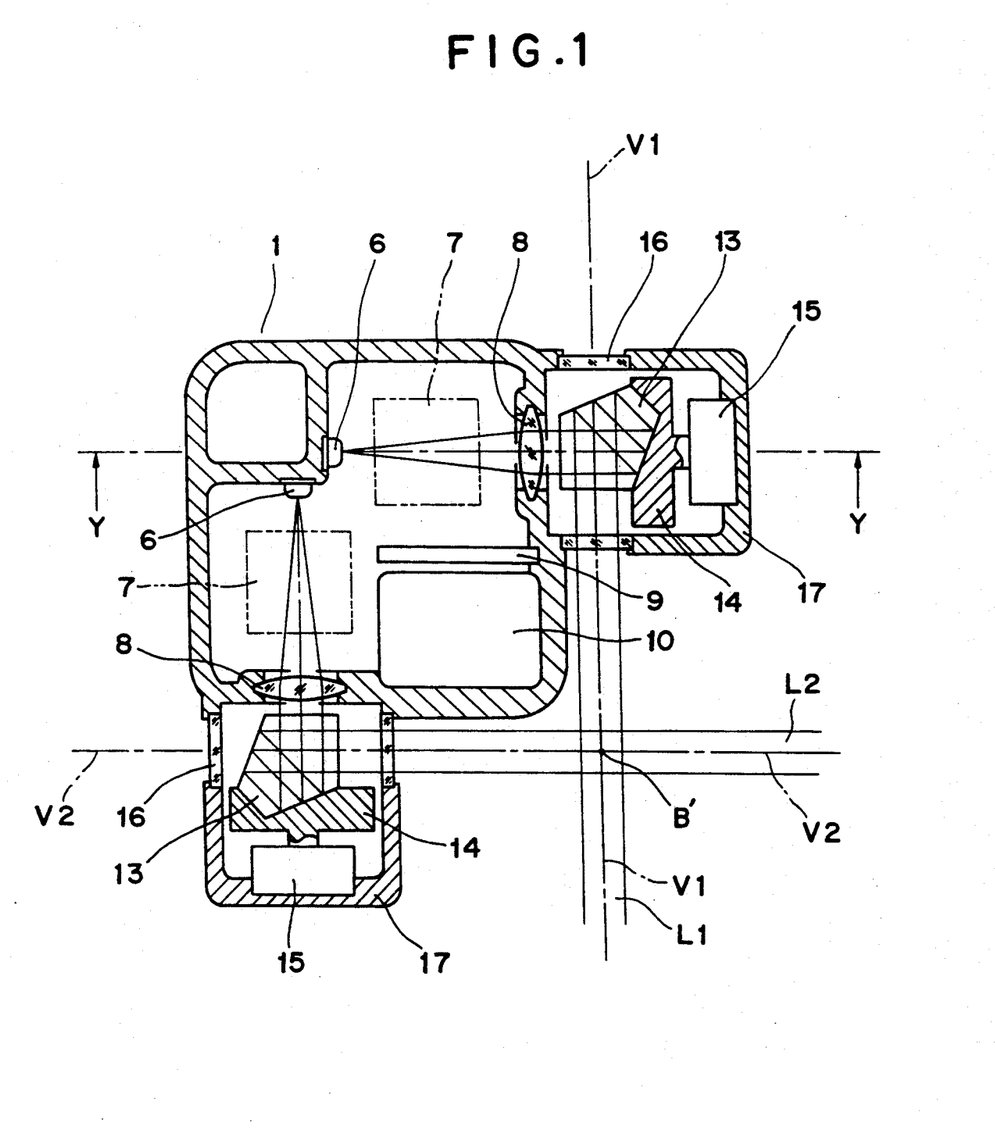
FIG. 1 is a sectional view schematically showing an embodiment of the machine constructed according to the invention.

The present invention provides here a surveying machine for construction work comprising, as shown by FIG. 1, a pair of radiant optical systems adapted to radiate laser light emitted from respective light sources 6 in the form of laser beams and rotating projector means adapted for rotationally projecting the laser beams radiated from said pair of radiant optical systems in planes being perpendicular to each other.

Specifically, in the embodiment shown by FIG. 1, the pair of radiant systems being perpendicular to each other in a plane extending in parallel to the plane of the drawing is so arranged that the laser beams radiated from the respective radiant lenses 8 are incident upon respective two-face reflector members 13 which are rotationally driven by respective electromotor 15 and laser beams L1, L2 reflected on the respective two-face reflector members 13 are rotationally projected in planes V1, V2 being perpendicular to each other and to the plane of the drawing.

Accordingly, if both the laser light emitted from said pair of light sources 6 is propagated in a common horizontal plane, the laser beams L1, L2 reflected on the respective two-face reflector members 13 will be rotationally projected in the vertical planes V1, V2 being perpendicular to each other. On the other hand, if the radiant optical system extending from the light source 6 to the radiant lens 8 laterally as viewed in FIG. 1 is horizontal arranged and the radiant optical system extending from the light source 6 to the radiant lens 8 downwardly as viewed in FIG. 1 is vertically arranged, the laser beam L1 radiated from said laterally extending radiant optical system will be rotationally projected in the vertical plane V1 and the laser beam L2 radiated from said downwardly extending radiant optical system will be rotationally projected in the horizontal plane V2.

In an embodiment shown by FIG. 1, the laser light emitted from the pair of light sources 6 is propagated in a common horizontal plane and therefore the laser beams L1, L2 substantially collimated by the pair of radiant optical systems from the laser light emitted by the respective light sources 6 are rotationally projected in the vertical planes V1, V2 being perpendicular to each other.

There may be provided, in addition to said pair of radiant optical system, a radiant optical system having an optical axis connecting a light source and radiant lens 8 extending perpendicularly to the plane of FIG. 1 to obtain an arrangement such that the laser beam radiated from the additional radiant lens 8 in the direction perpendicular to the plane of FIG. 1 is incident upon the associated two-face reflector member 13 being rotated by the electromotor 15 and third laser beam L3 reflected on said two-face reflector member are rotationally projected in a horizontal plane H.

Figure 3:
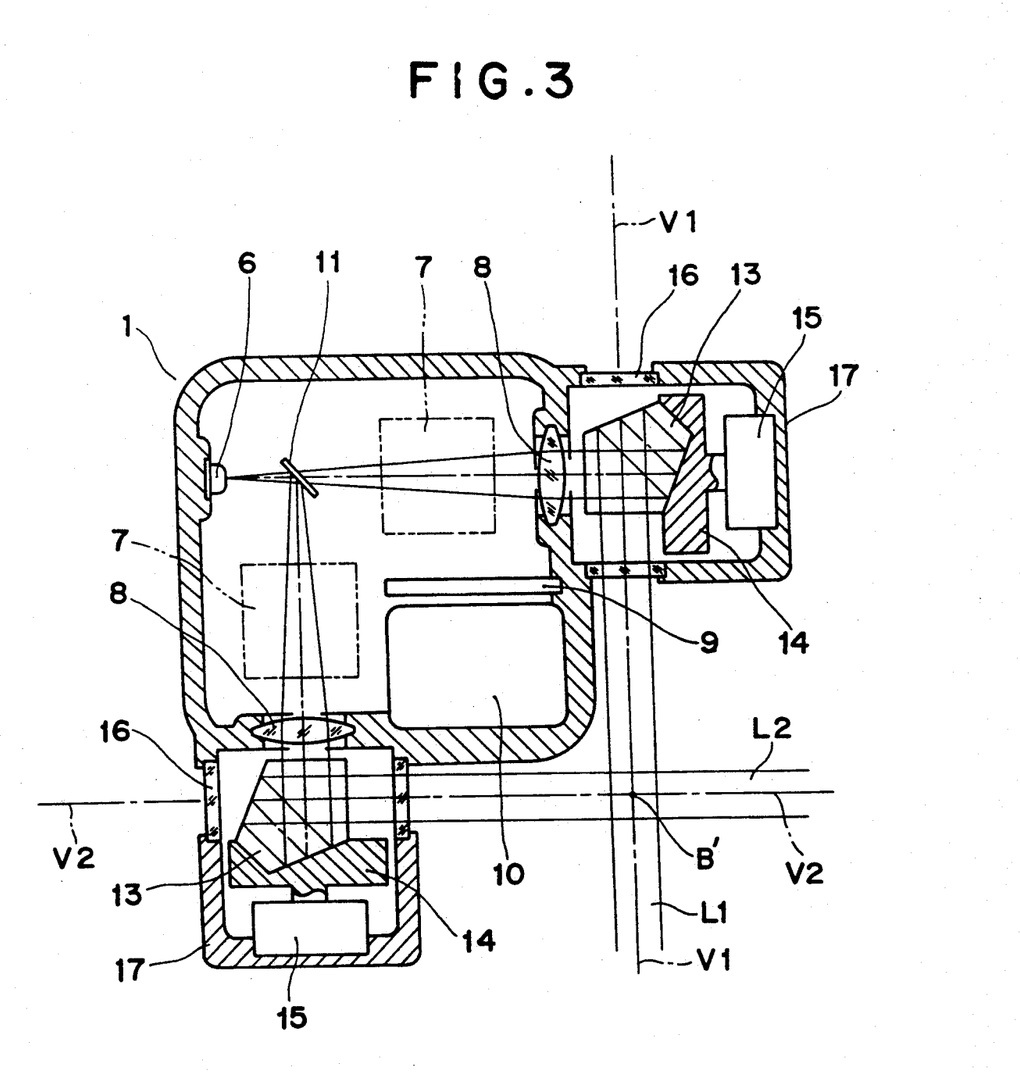
FIG. 3 is sectional view schematically showing another embodiment of the machine constructed according to the invention.

In an embodiment shown by FIG. 3, assuming that the plane of this figure is a horizontal plane, there is provided a semi-transmissive reflector 11 on the optical path of the laser light directed from the light source 6 toward the compensator 7 and the radiant lens 8 laterally as viewed in FIG. 3 so that said semi-transmissive reflector 11 may reflect approximately a half of the incident quantity downward as viewed in FIG. 3 and approximately a half thereof transmitted through said semi-transmissive reflector 11 is directed laterally as viewed in FIG. 3. These pair of mutually perpendicular laser beams are respectively reflected on the two-face reflector members 13 being rotated by the associated electromotors 15 and these reflected laser beams L1, L2 which are perpendicular to the plane of the drawing and to each other are rotationally projected in the vertical planes V1, V2, respectively. This arrangement is substantially similar to the arrangement shown by FIG. 1 except that the quantity of laser light emitted from each light source is approximately halved.

It should be understood that said semi-transmissive reflectors 11 may be replaced by semi-transmissive prisms, respectively.

Figure 4:
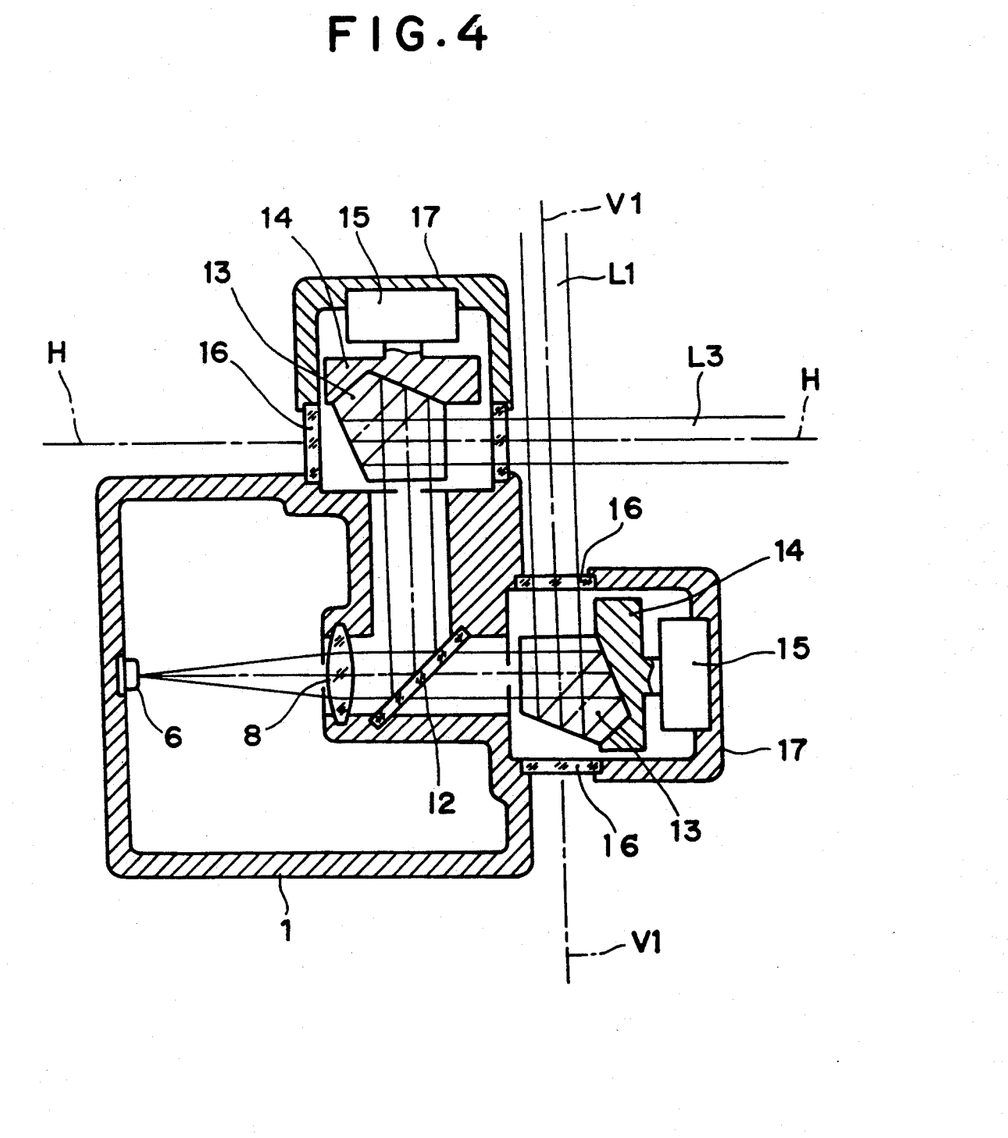
FIG. 4 is a sectional view schematically showing still another embodiment of the machine constructed according to the invention.

Now referring to FIG. 4, there is shown an alternative embodiment similar to the previously mentioned embodiment shown by FIG. 2 except that there is additionally provided the laser beam L3 adapted to be rotationally projected in a horizontal plane H.

More specifically, the embodiment shown by FIG. 4 comprises a semi-transmissive reflector 12 behind the radiant lens 8 of the previous embodiment shown by FIG. 2 so that said semi-transmissive reflector 12 may vertically reflect approximately a half L3 of the incident laser beam and approximately a half L1 thereof may be transmitted through said semi-transmissive reflector 12. The transmitted laser beam L1 is rotationally projected by the associated two-face reflector 13 in the vertical plane V1 while the reflected laser beam L3 is rotationally projected by the associated two-face reflector 13 in the horizontal plane H.

While all of the previously mentioned embodiments are illustrated as having their rotating two-face reflector members 13 being directly coupled to the associated electromotors 15, it will be apparently understood by those skilled in the art that these rotating two-face reflector members may be arranged to be rotated indirectly by a suitable transmission gear utilizing pulleys, gears or the like.

It is also practical that the respective two-face reflector members 13 are rotated in operative association with a single electromotor or, at most, a pair of electromotors via a suitable transmission mechanism comprising pulleys, gears or the like.

Said two-face reflector members 13 and the electromotors 15 associated therewith constitute together the respective rotating projector means of the invention, which can be remote controlled. As specifically illustrated by FIG. 10, a laying off operator F may actuate a portable remote controller to send a control signal to the machine body S and thereby to adjust the r.p.m. of the respective laser beams or to stop rotation of them or to turn the source switch on or off.

Reference numeral 9 designates an electronic circuit used to drive various components such as the light source 6 and the electromotors 15. Reference numeral 10 designates a power source used to drive said electronic circuit 9 and the other components such as the light source 6 and the electromotors 15. Reference numeral 16 designates laser beam radiating windows associated with the respective rotating projector means. Reference numeral 14 designates supporting frames for the respective two-face reflector members and reference numeral 17 designates supporting frames for the respective electromotors.

Now referring to FIGS. 5 through 9, the present invention will be described further in details by way of the other embodiments.

Figure 5:
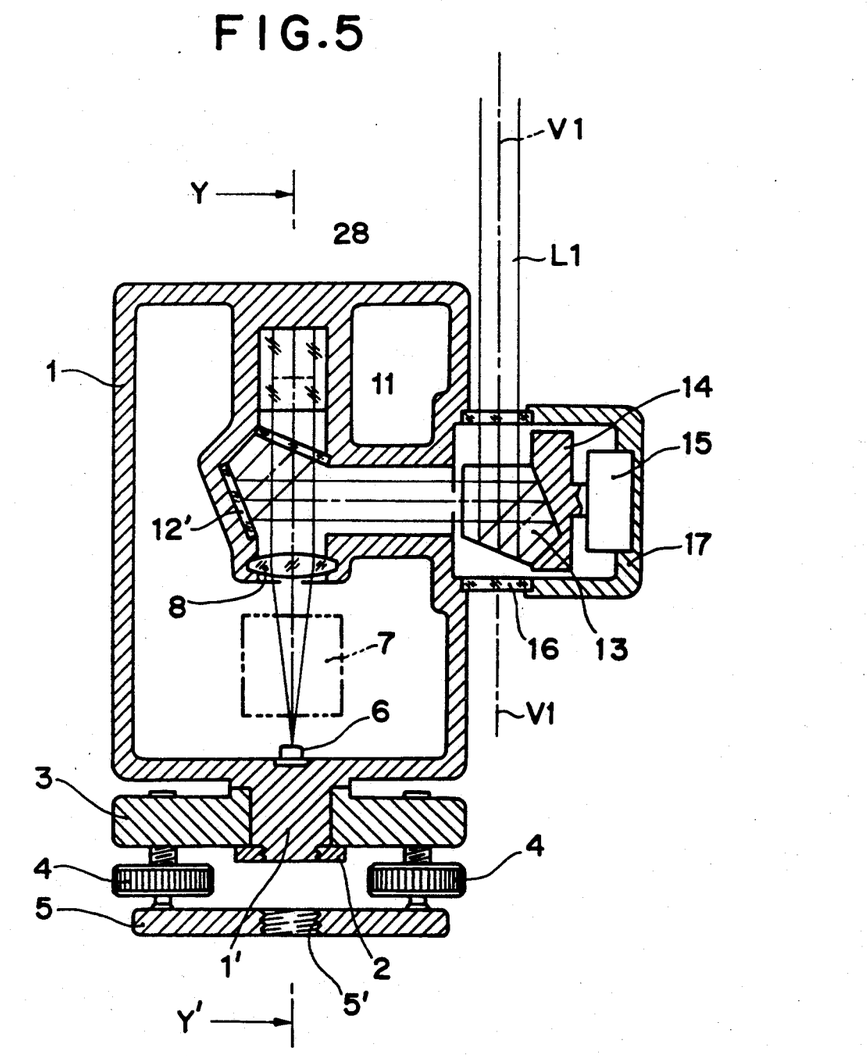
FIG. 5 is a sectional view schematically showing further another embodiment of the machine constructed according to the invention.
Figure 6:
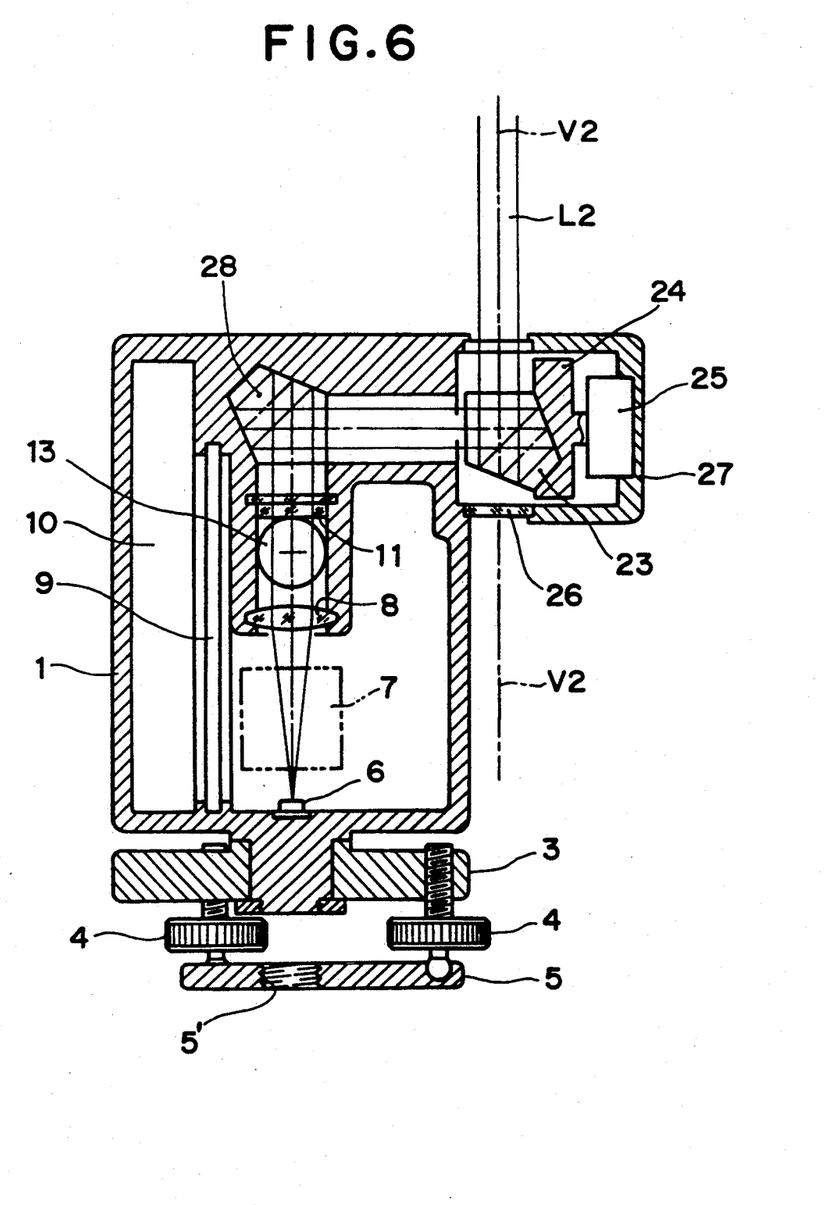
FIG. 6 is schematic sectional view taken along a line Y—Y normal to the plane of FIG. 5.
Figure 7:
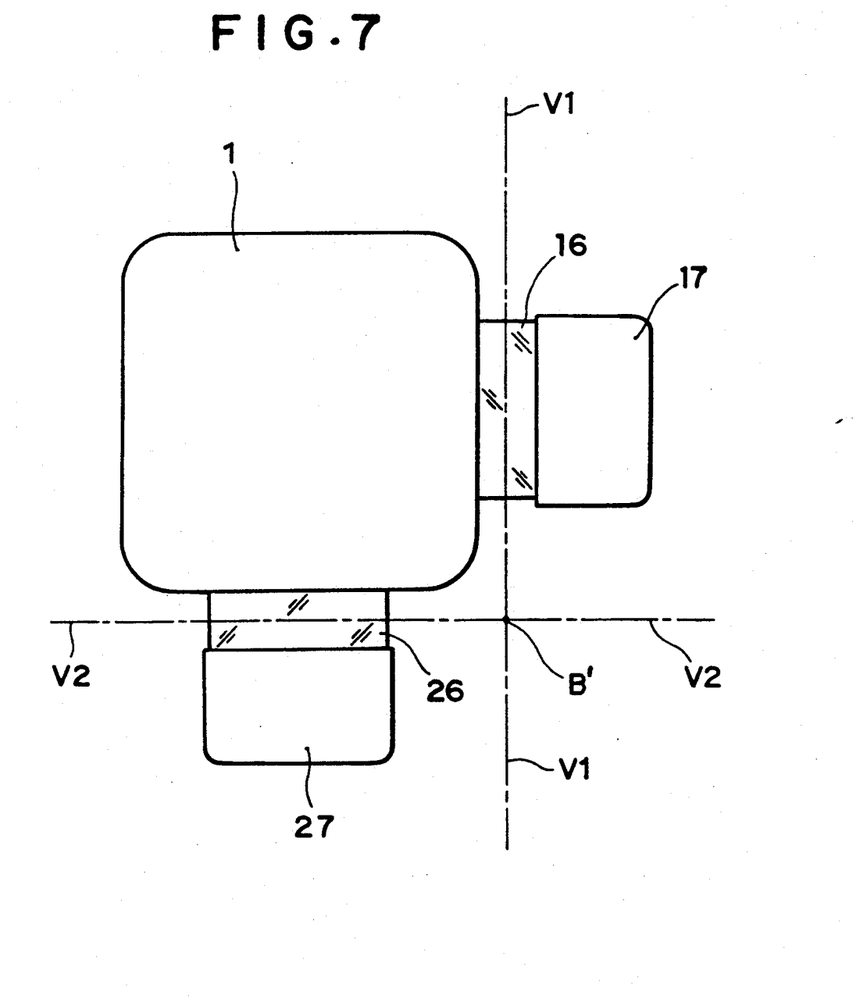
FIG. 7 is a plan view of the embodiment shown by FIG. 5.

An embodiment shown by FIGS. 5 through 7 is so arranged that the laser beam substantially collimated by the radiant lens 8 is incident upon the semi-transmissive reflector 11 and approximately a half of these incident laser beam is reflected thereon toward a reflector 12' which, in turn, reflects said laser beams toward the two-face reflector member 13. It should be understood that said semi-transmissive reflector 11 may be replaced by a semi-transmissive prism. The construction (such as the configuration and the number) and the manner of reflection (such as the reflecting direction and frequency) of said reflector 12' depend on presence or absence of said compensator and a compensating efficiency thereof, if present. The two-face reflector member 13 rotated by the electromotor 15 and the laser beam L1 reflected on the two-face reflector member 13 is rotationally projected in the vertical plane V1.

Approximately a half of the laser beam transmitted through said semi-transmissive reflector 11 are reflected on a two-face reflector member 28 which, in turn, reflects this laser beam toward a two-face reflector member 23 so that the laser beam L2 reflected in this two-face reflector member 23 may be rotationally projected in a vertical plane as said two-face reflector member 23 is rotated by an electromotor 25.

It should be understood that the two-face reflector member 28 may comprise a prism or a reflector its construction (such as the figuration and the number) and its manner of reflection (such as the reflecting direction and frequency) depend on, as has already been noted, presence or absence of said compensator and a compensating efficiency thereof if present.

A rotatable shaft of the two-face reflector member 23 is displaced from a rotatable shaft of said two-face reflector member 13 by an angle of 90° in a horizontal plane and consequently the two laser beams L1, L2 are rotationally projected in the vertical planes V1, V2, respectively, which are perpendicular to each other.

Figure 8:
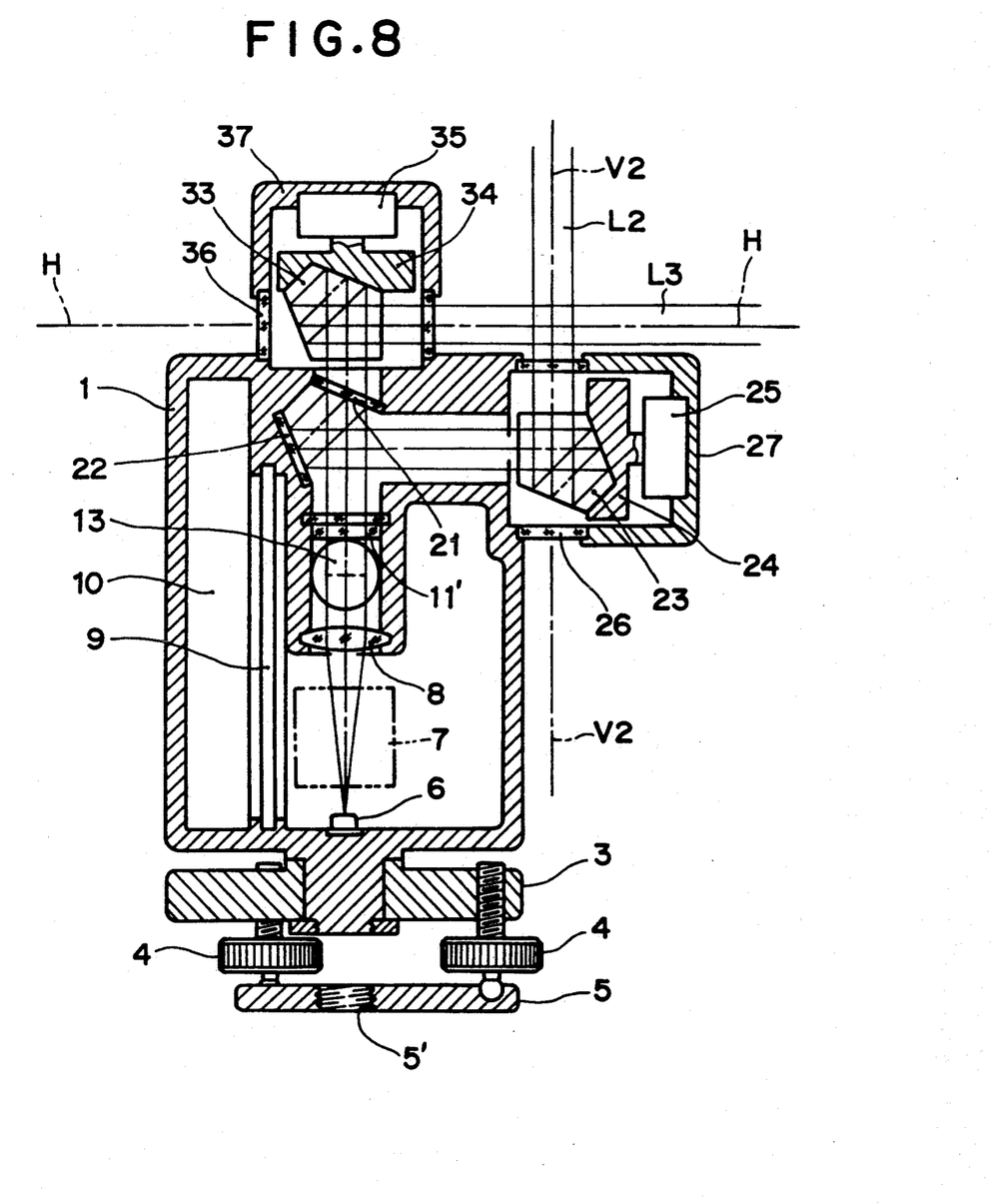
FIG. 8 is a sectional view schematically showing an additional embodiment of the machine constructed according to the invention.

Referring to FIG. 8, there is shown further another embodiment which is similar to the embodiment as has been mentioned just above except that there is provided an additional laser beam L3 adapted to be rotationally projected in the horizontal plane H.

The embodiment of FIG. 8 is different from the previous embodiment in that the semi-transmissive reflector 11 is replaced by a semi-transmissive reflector 11' adapted to transmit approximately two-thirds of the incident light and the two-face reflector member 28 is replaced by a combination of a semi-transmissive reflector 21 adapted to transmit approximately a half of the incident light.

Approximately one-third L3 of the total incident laser beam transmitted through the semi-transmissive reflector 21 is rotationally projected by a two-face reflector member 33 in the horizontal plane H as said two-face reflector member 33 is rotated by an electromotor 35.

In this embodiment also, the semi-transmissive reflector 21 may be replaced by a semi-transmissive prism.

While all of the previously mentioned embodiments are illustrated as having their rotating two-face reflector members 13, 23, 33 being coupled directly to the associated electromotors, it will be apparently understood by those skilled in the art that these rotating two-face reflector members may be arranged to be rotated indirectly by a suitable transmission gear utilizing pulleys, gears or the like.

It is also practical that the respective two-face reflector members 13, 23, 33 are rotated in operative association with a single or at most a pair of electromotors 15, 25, 35 via a suitable transmission mechanism comprising pulleys, gears or the like.

Said two-face reflector members 13, 23, 33 and the electromotors 15, 25, 35 associated therewith constitute together the respective rotating projector means of the invention, which can be remote controlled. As specifically illustrated by FIG. 10, a laying off operator F may actuate a portable remote controller to send a control signal to the machine body S and thereby to adjust the r.p.m. of the respective laser beams or to stop rotation of them or to turn the source switch on or off.

Reference numeral 9 designates an electromotor circuit used to drive various components such as the light source 6 and the electromotors 15, 25, 35. Reference numeral 10 designates a power source used to drive said electronic circuit 9 and the other components such as the light source 6 and the electromotors 15, 15, 35. Reference numerals 16, 26, 36 designate laser beam radiating windows associated with the respective rotating projector means. Reference numerals 14, 24, 34 designate supporting frames for the respective two-face reflector members and reference numerals 17, 27, 37 designate supporting frames for the respective electromotors.

Figure 9:
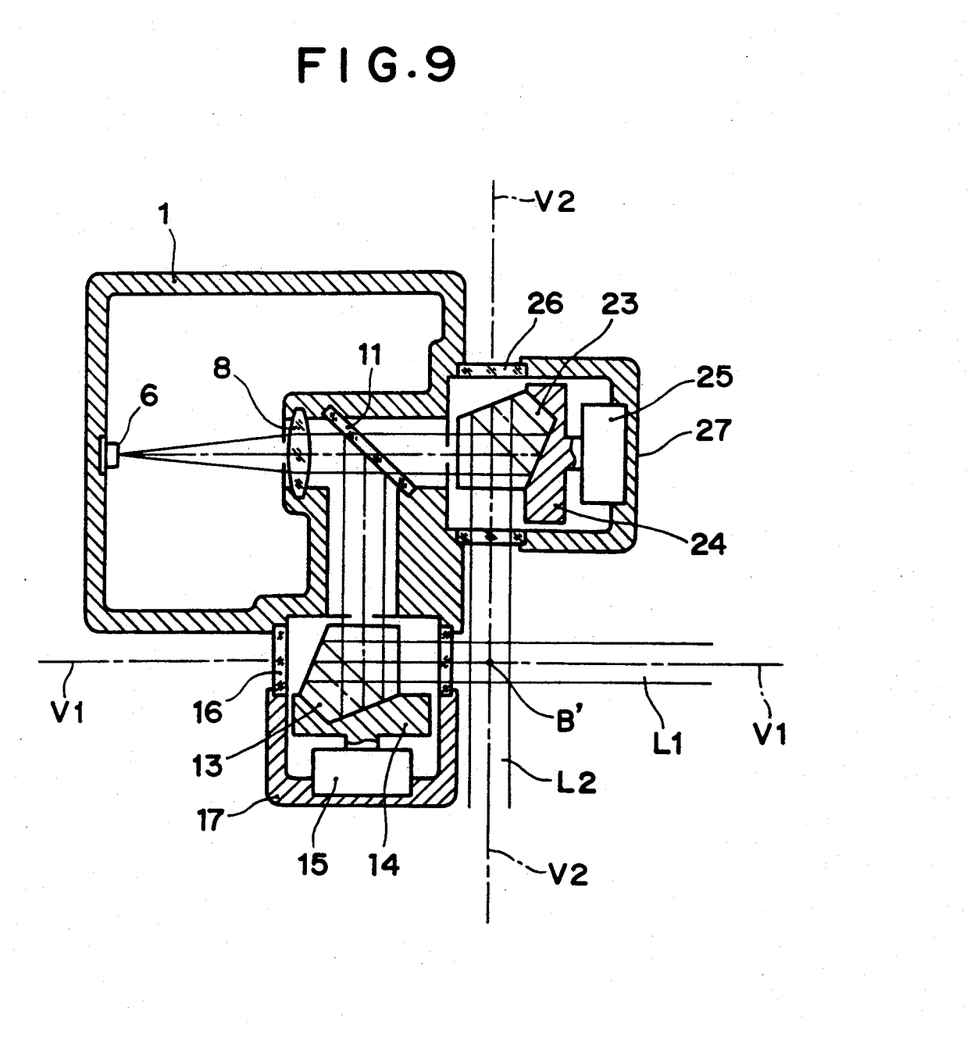
FIG. 9 is sectional view schematically showing further additional embodiment of the machine constructed according to the invention.

Referring to FIG. 9, there is shown still another embodiment of the invention, in which the two-face reflector member 28 employed in the embodiments shown by FIGS. 5 and 6 is eliminated by propagating the laser beam radiated from the radiant lens 8 in a horizontal plane.

Specifically, approximately a half L1 of the laser beam incident on the semi-transmissive reflector 11 is reflected thereon horizontally toward the two-face reflector member 13 being rotated by the electromotor and rotationally projected from this two-face reflector member 13 in the vertical plane V1, on one hand, and approximately a half L2 of the laser beam incident on the semi-transmissive reflector 11 is transmitted therethrough horizontally toward the two-face reflector member 23 being rotated by the electromotors 25 and rotationally projected from this two-face reflector 23 in the vertical plane V2, on the other hand.

As in this embodiment of FIG. 9, the reflector 12 employed in the embodiment of FIG. 5 can be eliminated by directing the laser beam reflected on the semi-transmissive reflector 11 immediately toward the two-face reflector member 13, and the two-face reflector member 28 can be eliminated by directing the laser beam transmitted through said semi-transmissive reflector 11 immediately toward the electromotor.

In the embodiment of FIG. 8, the reflector 22 could be eliminated, if the laser beam reflected on the semi-transmissive reflector 21 is directed immediately toward the two-face reflector member 23.

Now referring to FIG. 10, a manner in which the surveying machine constructed according to the teachings of the invention as has been described by way of several embodiments is used in the field will be discussed. When a new station C is set up on a line extending perpendicularly to a line connecting existing stations A and B, the surveying machine S for construction work is mounted on the tripod T so that an intersecting point B' of the laser beams L1, L2 is on a vertical line extending above the existing station B.

The position of the intersecting point B' relative to the existing station B is detected by a plumb bob P or a centering telescope of well known art (not shown) incorporated in the machine S. Then the laser beam L1 is brought in coincidence with the existing station A. The coincidence will be visually detected if the laser beam is visible and will be detected by suitable detector means if the laser beam is invisible. A point indicated by the laser beam L2 may be marked to obtain the new station C lying on the line which is normal to the line connecting the existing stations A, B.

It should be understood that the new station C also will be set up by using suitable detector means if the laser beam is invisible.

With the arrangement that the laser beam L3 is rotationally projected in the horizontal plane as in the embodiment shown by FIG. 4 or FIG. 8, a new station C lying at the same level as the existing station A can be obtained immediately at lever indicated by the projected laser beam L3.

The surveying machine for construction work arranged in accordance with the invention as has been described hereinabove provides advantageous effects as follow:

(1) Since the laser beam L1 is rotationally projected in the vertical plane, the laser beam L1 can easily be brought in coincidence with the existing station no matter how near or remote said existing station is and no matter how high or low said existing station is. This arrangement is more easily carried out than the conventional surveying method utilizing the theodolite D requiring depression and elevation of the telescope as well as the focussing operation by a surveying engineer E.

(2) Once the machine S has been installed, no more manipulation of the machine S by said surveying engineer is necessary to obtain a new station and consequently the labor can be reduced by at least one person.

(3) Since the laser beam L2 is rotationally projected in the vertical plane, a desired number of new stations can be set up no matter how these new stations are high or low and near or remote without manipulation of the machine S more easily than with the conventional surveying method utilizing the theodolite D requiring depression, elevation, as well as focusing of the telescope and indication of the new station all by the surveying engineer E for every new station.

(4) The surveying machine of the invention is useful not only for setting up of right angle but also for setting up of vertical plane utilizing the laser beam L1 or L2 and further for setting up of vertical line by setting up an intersecting point of the laser beams L1, L2.

(5) The surveying machine provided with the compensator within the radiant optical system allows the rotationally projected laser beam to be maintained in a vertical plane regardless of a tilt of the machine.

(6) The surveying machine provided with the rotating projector means adapted for rotational projection of the laser beam in the horizontal plane is useful also for setting up of horizontal plane and can be utilized as a leveling instrument.

(7) The surveying machine provided with the independent radiant optical systems each adapted to form a laser beam from laser light emitted by the associated light source allows the arrangement to be simplified with the number of reflecting surfaces correspondingly reduced. Consequently, a light loss is also substantially reduced. Additionally, no distribution of the laser beam occurs. Thus, the quantity of radiated laser beam can be increased sufficiently to reach targets at a longer distance.

(8) With the arrangement including a semi-transmissive reflector or prism adapted to divide the laser light emitted from the light source into two directions and a pair of radiant optical systems adapted to radiate said divided laser light in the form of two separate laser beams, it is possible to use a single light source commonly for said pair of radiant optical systems and thereby to save a power consumption. Therefore, it is possible to prolong a duration of use when a battery is utilized as the power source.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A surveying machine for construction work comprising rotating projector means for simultaneously rotationally projecting at least a pair of laser beams in at least two generally perpendicular planes, the rotating projector means comprises at least two two-face reflector members, each reflector member reflecting one of the laser beams, at least two light sources, each of the two-face reflector members having one light source associated therewith, the light sources each emitting laser light.

2. The surveying machine as recited in claim 1, further comprising a radiant lens positioned between each light source and the associated two-face reflector, the rotating projector means further comprises drive means for rotating each of the two-face reflector members.

3. A surveying machine for construction work comprising rotating projector means for simultaneously rotationally projecting at least a pair of laser beams in at least two generally perpendicular planes, the rotating projector means comprises at least two two-face reflector members, each reflector member reflecting one of the laser beams, the surveying machine has two two-face reflector members, a reflector device and a single light source for emitting laser light, some of the laser light emitted by the light source is reflected by the reflector device to one of the two-face reflector members while other laser light is transmitted through the reflector device to the other two-face reflector member, the reflector device being one of a semi-transmissive reflector and a prism, the rotating projector means further comprises drive means for rotating each of the two-face reflector members.

4. A surveying machine for construction work comprising rotating projector means for simultaneously rotationally projecting at least a pair of laser beams in at least two generally perpendicular planes, the rotating projector means comprises two two-face reflector members, each reflector member reflecting one of the laser beams, the surveying machine further comprising a reflector device and a single light source for emitting laser light, one of the two-face reflector members receives light reflected vertically from the reflector device to thereby emit a laser beam in a generally horizontal plane from the machine while the other of the two-face reflector members receives light transmitted through the reflector device to thereby emit a laser beam in a generally vertical plane from the machine, the reflector device being one of a semi-transmissive reflector and a prism, the rotating projector means further comprises drive means for rotating each of the two-face reflector members.

5. A surveying machine for construction work comprising rotating projector means for simultaneously rotationally projecting at least a pair of laser beams in at least two generally perpendicular planes, the rotating projector means comprises at least two two-face reflector members, each reflector member reflecting one of the laser beams, the surveying machine further comprising a reflector device and a single light source for emitting laser light, first and second two-face reflector members being provided, the first two-face reflector member receives light reflected from the reflector device to thereby emit a first laser beam in a generally vertical plane from the machine while the second two-face reflector member receives light transmitted through the reflector device to thereby emit a second laser beam in a generally vertical plane from the machine, the reflector device being one of a semi-transmissive reflector and a prism, the surveying machine further comprising a reflector for receiving the laser light reflected by the reflector device and for emitting the laser light to the first two-face reflector, the surveying machine further comprising a third two-face reflector member, the third two-face reflector member receives laser light transmitted through the reflector device and reflects the light to the second two-faced reflector.

6. The surveying machine as recited in claim 5, wherein the rotating projector means further comprises drive means for rotating each of the two-face reflector members.

7. A surveying machine for construction work comprising rotating projector means for simultaneously rotationally projecting at least a pair of laser beams in at least two generally perpendicular planes, the rotating projector means comprises at least two two-face reflector members, each reflector member reflecting one of the laser beams, the surveying machine further comprising a first and second reflector device and a single light source for emitting laser light, the laser light being divided by the first reflector device such that about two-thirds of the light is transmitted therethrough and one-third of the light is reflected thereby to one of the two-face reflector members, the second reflector device receives the two-thirds of the light from the first reflector device and reflects some of this light to a second one of the two-face reflector members and remaining light being transmitted through the second reflector device to a third one of the two-face reflectors such that three laser beams are emitted from the machine, the reflector devices being at least one of a semi-transmissive reflector and a prism.

8. The surveying machine as recited in claim 7, wherein one of the three laser beams is located in a generally horizontal plane while the other two laser beams are located in generally vertical planes.

9. The surveying machine as recited in claim 7, wherein the rotating projector means further comprises drive means for rotating each of the three two-face reflector members.

10. A surveying machine for construction work comprising rotating projector means for simultaneously rotationally projecting at least a pair of laser beams in at least two generally perpendicular planes, the rotating projector means comprises at least two two-face reflector members, each reflector member reflecting one of the laser beams, the surveying machine further comprising a reflector device and a single light source for emitting laser light, some of the laser light being reflected by the reflector device to a first two-face reflector member while other laser light is transmitted through the reflector device to a second two-face reflector member, a radiant lens being provided between the single light source and the reflector device and the reflector device being one of a semi-transmissive reflector and a prism, the rotating projector means further comprises drive means for rotating the first and second two-face reflector members.

11. A surveying machine for construction work comprising rotating projector means for simultaneously rotationally projecting at least a pair of laser beams in at least two generally perpendicular planes, the rotating projector means comprises at least two two-face reflector members, each reflector member reflecting one of the laser beams, the surveying machine further comprising a compensator for maintaining a rotationally projected laser beam in one of a generally horizontal and generally vertical plane regardless of tilting of the surveying machine.

* * * * *